(No Model.)
S. LEE.
PUNCTURE PROOF BAND FOR PNEUMATIC TIRES.
No. 513,583.            Patented Jan. 30, 1894.
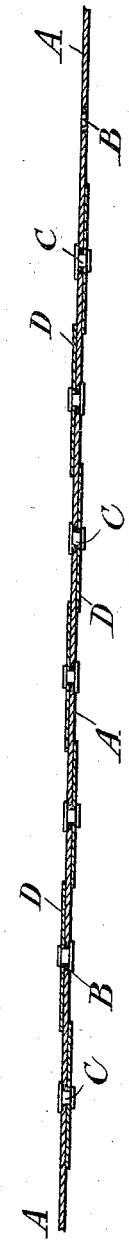
Witnesses
A. N. Dobson
G. P. Kramer.
Inventor
Sydney Lee
By his attorneys
Foster & Freeman

UNITED STATES PATENT OFFICE.

SYDNEY LEE, OF LONDON, ENGLAND, ASSIGNOR TO THE PUNCTURE PROOF PNEUMATIC TYRE COMPANY, LIMITED, OF SAME PLACE, AND DUBLIN, IRELAND.

PUNCTURE-PROOF BAND FOR PNEUMATIC TIRES.

SPECIFICATION forming part of Letters Patent No. 513,583, dated January 30, 1894.

Application filed September 30, 1893. Serial No. 486,896. (No model.)

*To all whom it may concern:*

Be it known that I, SYDNEY LEE, a subject of the Queen of England, residing at London, England, have invented certain new and useful Improvements in Puncture-Proof Bands for Pneumatic Tires, of which the following is a specification.

This invention relates to puncture proof bands for use in what are well known as pneumatic tires for vehicles, the object being to provide a flexible band which shall not seriously interfere with the resilience of the tire, but will nevertheless prevent sharp articles such as thorns, stones, nails, and the like, from penetrating the air-containing tube.

In the accompanying drawing,—the figure represents a longitudinal section through a protecting band embodying my invention.

Like letters of reference indicate like parts.

A represents a band or strip of canvas, silk or other suitable flexible material, the band being made of the width required and of a length to go entirely round the tire, the ends being joined either in the weaving of the band or subsequently so as to produce a complete ring, or if desired the band may not be a complete ring, but a straight strip which may be placed in position round the tire and the ends connected by stitching or in any other suitable manner.

The band A carries upon it very thin flexible plates D of steel or other suitable metal or material; these plates are fixed upon the band in any desired manner as by copper or similar rivets C passing through an eyelet B fixed in the band A the rivet having a head at one end and being riveted over or headed at the other after it is placed through the plate and band. These rivets are preferably placed in the center of the plates D so as to allow the latter to turn and accommodate themselves to the shape and working of the tire to which they are applied. They may however be placed in other parts of the plates and more than one rivet may be employed with one plate, or the plates may be otherwise secured to the band A.

The plates D are arranged upon the band A; alternately upon opposite sides of the band their edges overlapping sufficiently to prevent thorns, nails or the like passing between them. By this arrangement the flexibility and accommodating powers of the band are greatly increased and a much more useful protective band is produced than has hitherto been the case.

This protecting band would usually be placed between the air tube and the cover.

The protector as above described may be inclosed in any suitable canvas or similar bag if desired.

I claim—

1. In a tire protector the combination with a flexible band or strip of puncture proof plates arranged alternately upon opposite sides of the band, substantially as described.

2. In a tire protector the combination with a flexible band of non-puncturable plates arranged alternately upon opposite sides of the band with their edges overlapping, substantially as described.

3. In a tire protector the combination with a flexible strip or band of plates arranged alternately upon opposite sides thereof eyelets in the band and rivets passing through both plates and eyelets as set forth.

In testimony whereof I have hereto set my hand in the presence of the two subscribing witnesses.

SYDNEY LEE.

Witnesses:
ALFRED J. BOULT,
HARRY B. BRIDGE.